US011299151B2

(12) United States Patent
Ondruska et al.

(10) Patent No.: US 11,299,151 B2
(45) Date of Patent: Apr. 12, 2022

(54) ENHANCED VEHICLE TRACKING

(71) Applicant: Woven Planet North America, Inc., Los Altos, CA (US)

(72) Inventors: Peter Ondruska, London (GB); Lukas Platinsky, London (GB); Suraj Mannakunnel Surendran, London (GB)

(73) Assignee: Woven Planet North America, Inc., Los Altos, CA (US)

( * ) Notice: Subject to any disclaimer, the term of this patent is extended or adjusted under 35 U.S.C. 154(b) by 149 days.

(21) Appl. No.: 16/862,058

(22) Filed: Apr. 29, 2020

(65) Prior Publication Data
US 2020/0377084 A1 Dec. 3, 2020

Related U.S. Application Data

(63) Continuation of application No. 16/459,590, filed on Jul. 1, 2019, now Pat. No. 10,668,921, which is a
(Continued)

(30) Foreign Application Priority Data

Mar. 15, 2018 (GB) .................................... 1804195
Jun. 29, 2018 (GB) .................................... 1810797

(51) Int. Cl.
*B60W 30/095* (2012.01)
*G01C 21/36* (2006.01)
(Continued)

(52) U.S. Cl.
CPC ..... *B60W 30/0956* (2013.01); *G01C 21/3635* (2013.01); *G01C 21/3647* (2013.01);
(Continued)

(58) Field of Classification Search
CPC ......... B60W 30/0956; B60W 2520/06; B60W 2520/10; G05D 1/0212; G05D 1/0214;
(Continued)

(56) References Cited

U.S. PATENT DOCUMENTS 7,610,182 B2 10/2009 Smith et al.
9,120,484 B1 9/2015 Ferguson et al.
(Continued)

FOREIGN PATENT DOCUMENTS

GB 2545550 6/2017
WO 2017035663 3/2017

OTHER PUBLICATIONS

Chen et al., "Modeling and Predicting Future Trajectories of Moving Objects in a Constrained Network", Mobile Data Management, MDM 2006, 7th International Conference on Nara, Japan, May 10-12, 2006, p. 156.
(Continued)

*Primary Examiner* — Nadeem Odeh
(74) *Attorney, Agent, or Firm* — Christopher G. Darrow; Darrow Mustafa PC

(57) ABSTRACT

The present invention relates to a method and system for accurately predicting future trajectories of observed objects in dense and ever-changing city environments. More particularly, the present invention relates to substantially continuously tracking and estimating the future movements of an observed object. As an example, an observed object may be a moving vehicle, for example along a path or road. Aspects and/or embodiments seek to provide an end to end method and system for substantially continuously tracking and predicting future movements of a newly observed object, such as a vehicle, using motion prior data extracted from map data.

20 Claims, 15 Drawing Sheets

Related U.S. Application Data continuation of application No. PCT/GB2019/050515, filed on Feb. 25, 2019.

(51) Int. Cl.
*G05D 1/02* (2020.01)
*G06F 17/18* (2006.01)
*G06K 9/00* (2022.01)
*G06T 7/20* (2017.01)

(52) U.S. Cl.
CPC ........... *G05D 1/0212* (2013.01); *G06F 17/18* (2013.01); *G06K 9/00671* (2013.01); *G06K 9/00791* (2013.01); *G06T 7/20* (2013.01); *B60W 2520/06* (2013.01); *B60W 2520/10* (2013.01); *G05D 1/027* (2013.01); *G05D 1/0214* (2013.01); *G05D 1/0231* (2013.01); *G05D 2201/0213* (2013.01)

(58) Field of Classification Search
CPC ................. G05D 1/0231; G05D 1/027; G05D 2201/0213; G06K 9/00791; G06K 9/00671; G06K 9/00; G06K 9/62; G06K 9/00805; G06K 9/6297; G06K 9/00771; G01C 21/3635; G01C 21/3647; G06F 17/18; G06T 7/20
See application file for complete search history.

(56) References Cited

U.S. PATENT DOCUMENTS

| | | |
|---|---|---|
| 9,483,948 B1 | 11/2016 | Gordon et al. |
| 9,495,874 B1 | 11/2016 | Zhu et al. |
| 2014/0327792 A1 | 11/2014 | Mulloni et al. |
| 2016/0334797 A1 | 11/2016 | Ross et al. |
| 2017/0177937 A1 | 6/2017 | Harmsen et al. |
| 2017/0268895 A1 | 9/2017 | Myers et al. |
| 2017/0301107 A1 | 10/2017 | Sasaki |

OTHER PUBLICATIONS

Leibe, et al. "Dynamic 3D Scene Analysis from a Moving Vehicle", IEEE Conference on Computer Vision and Pattern Recognition, Jun. 2007.

Nadembega et al., "A Destination Prediction Model based on historical data, contextual knowledge and spatial conceptual maps", Communications (ICC), IEEE International Conference, Jun. 10, 2012, pp. 1416-1420.

Nizetic et al., "Automation of the moving objects movement predicition process independent of the application area", Computer Science and Information Systems, vol. 7, No. 4, Jan. 2010, pp. 931-945.

Vu et al., "A method for predicting future location of a mobile user for location-based services system", Computers & Industrial Engineering, vol. 57, Iss. 1, Aug. 1, 2009, pp. 91-105.

Input
  $I_{1,2,...,N}$: camera images
  $G$: motion prior
  $T$: Tracking window length

Output
  $C_{1:N}$: detected cars in 2D images
  $S_{1:N}$: 3D pose and velocity of detected cars 1: $K_0 \leftarrow 0$
2: for $t = 1, 2, 3, ..., N$ do
     Estimate 6dof pose of the image.
3:     $q_t \leftarrow$ localise($I_t$)
     Detect 2D bounding boxes of the visible cars.
4:     $c_t^{1:K_t} \leftarrow$ detectVehicles($I_t$)
5:     for $i = 1, 2, ..., K_t$ do
         Init solution with a new observation track
6:         $s_t^i \leftarrow \mathrm{argmax}_s \, p(s | c_t^i, q_t, G)$
         Try to associate with any previously observed car
7:         for $t' = t-1, t-2, ..., t-T$ do
8:             for $j = 1, 2, ..., K_{t'}$ do
9:                 $s_t^{ij} \leftarrow \mathrm{argmax}_s \, p(s, c_t^i | c_{t'}^j, s_{t'}^j, q_t, G)$
10:                 if $p(s_t^{ij}) > p(s_t^i)$ then
11:                     $s_t^i \leftarrow s_t^{ij}$
12:                 end if
13:             end for
14:         end for
15:     end for
16: end for

Figure 2b

Input

$s_0$: initial state (position, rotation, velocity)
    $t$: time horizon
    $G$: motion prior

Output

$\hat{s}_{1:N}$: samples of the predicted future car state

Compute prior state relevance
1:  $Z \leftarrow \sum_{i,j} K(s^i_j, s_0)$
2:  $\mu^i_j \leftarrow \frac{1}{Z} K(s^i_j, s_0)$
    Sample future state
3:  for $k = 1,2,3,...,N$ do
       Sample prior state according to relevance
4:       $s^i_j \leftarrow \text{MultinomialSample}(G, \mu)$
       Sample future state
5:       $\hat{s}_k \leftarrow s^i_{j+t} + \epsilon$
6:  end for
7:  return $\hat{s}_{1:N}$

Figure 6

ENHANCED VEHICLE TRACKING

CROSS-REFERENCE TO RELATED APPLICATIONS

The present application is a continuation of U.S. application Ser. No. 16/459,590 filed Jul. 1, 2019, which is a continuation of International Application No. PCT/GB2019/050515 filed Feb. 25, 2019, which claims priority to Great Britain Patent Application No. 1804195.4 filed Mar. 15, 2018 and Great Britain Patent Application No. 1810797.9 filed Jun. 29, 2018, which are hereby incorporated by reference herein.

FIELD

The present invention relates to a method and system for accurately predicting future trajectories of observed objects in dense and ever-changing city environments. More particularly, the present invention relates to substantially continuously tracking and estimating the future movements of an observed object. As an example, an observed object may be a moving vehicle, for example along a path or road.

BACKGROUND

A fundamental task of robotics perception and planning in dynamic environments is the ability to predict future evolution of the situation around a robotic platform. For example, autonomous vehicles need to know about the positions of other cars and their future motion to plan and avoid collisions.

In robotics, critical tasks such as path planning and obstacle avoidance require the ability to predict or estimate the evolution of the environment around the robotic platform. Complex environments such as urban city traffic present significant challenges when it comes to such planning and perception. Methods for doing so play a significant role in reducing the risk of collisions, such as road accidents.

Currently, future movement predictions in semi-structured environments are usually based on assumed motion dynamics of the vehicles around the robotic platform or vehicle, for example by using a Kalman Filter. However, a common disadvantage is that these approaches often generalise the vast complexity of real world scenarios, such as busy intersections or turns, resulting in unreliable predictions. Similarly, the motion of vehicles in complex scenarios cannot usually be predicted reliably using simple motion models like linear extrapolation, especially if the prediction horizon is greater than a few seconds.

Another existing approach is to annotate the road infrastructure in the form of a semantic map by capturing and making a note of traffic rules which should indicate paths that vehicles are likely to follow. This has a benefit in that the map data can be used to extrapolate the expected motion of a car provided that a driver follows the traffic rules. However, the amount of work needed to produce such reliable maps and then to keep them updated is time consuming and heavily laborious.

It is an aim of the present invention to address one or more of the disadvantages associated with the prior art.

SUMMARY OF INVENTION

Aspects and/or embodiments seek to provide an end to end method and system for substantially continuously tracking and predicting future movements of a newly observed object, such as a vehicle, using motion prior data extracted from map data.

According to a first aspect, there is provided a method for substantially continuously tracking and estimating poses of one or more moving objects, the method comprising the steps of: receiving one or more images from at least one visual data sensor; determining pose data for the one or more images received from the visual data sensor; detecting one or more characteristics of said one or more moving objects in a substantially sequential plurality of the one or more images; and estimating one or more future poses of the one or more moving objects using the detected one or more characteristics of said one or more moving objects and sequential trajectory data from one or more prior moving objects.

Estimation of the future position of vehicles can be accurately determined by assessing characteristics of detected vehicles between image frames and combining this vehicle association with prior trajectory motion data. By providing an end to end pipeline for endlessly performing step by step association and motion prediction, the future position of a newly detected object, such as a vehicle, can be estimated without the need for any knowledge of the road infrastructure or traditional motions models.

Optionally, the step of determining pose data further comprises performing a visual based localisation for the or each image. Optionally, the visual based localisation is determined using 3D maps constructed by structure-from-motion algorithms.

Using visual sensors to perform localisation allows for the use of off the shelf components or the provision of a software layer on existing and/or available camera hardware.

Optionally, sequential trajectory data from one or more prior moving objects is extracted from 3D maps constructed using structure-from-motion techniques.

Information gathered from structure from motion can be used as a powerful high-fidelity prior to predict future trajectories of newly observed vehicles in the area without the need for any knowledge of road infrastructure or vehicle motion models.

Optionally, the step of detecting one or more characteristics of said one or more moving objects comprises the use of bounding boxes to indicate a moving object has been detected.

The use of bounding boxes can allow for the output of the detection to be presented in a format that is easy to understand for operators or personnel reviewing footage on which detections have been superimposed.

Optionally, the step of detecting one or more characteristics of said one or more moving objects comprises a confidence distribution over object categories.

The binary decision on whether a detection has been made can be based on the probability of whether or not a vehicle has been detected using for example a threshold above which a detection is deemed to be made.

Optionally, the step of detecting one or more characteristics of said one or more moving objects comprises the use of a Faster-RCNN object detector. Optionally, the Faster-RCNN is restricted to only detect for specific objects and above a predetermined threshold.

The specific object to be detected by the RCNN can be limited to a vehicle.

Optionally, the step of estimating one or more future poses of the one or more moving objects comprises estimating a 3D position of the object.

Pose data can relate to position and orientation.

Optionally, the step of estimating one or more future poses of the one or more moving objects comprises assuming that each of the one or more moving objects is part of a new independent trajectory. Optionally, determining a probability for each of the one or more moving objects being a part of a new independent trajectory.

It can be assumed that a newly detected vehicle is not the same as a previously detected vehicle and as such is traversing along its own path.

Optionally, the step of estimating one or more future poses of the one or more moving objects further comprises assuming that each of the one or more moving objects is the same object previously observed on an existing trajectory. Optionally, determining a probability of each of the one or more moving objects being the same object previously observed on an existing trajectory.

In this step, the method hypothesises that a newly detected vehicle is the same as a previously detected vehicle traversing along a path and can assess whether or not this hypothesis is correct.

Optionally, determining the probability comprises assessing the similarity of visual appearances of the one or more moving objects and a previously observed moving object on the same trajectory.

Assessing the similarity of visual appearances can include assessing the features of a vehicle within bounding detection boxes.

Optionally, the similarity of visual appearances comprises extraction of SIFT features of the one or more moving objects in an image and a previously observed moving object in a previous image.

Optionally, determining the probability further comprises comparing the estimated 3D position of the one or more moving object to its detection in a following image. Optionally, comprising the use of a re-projection constraint.

In this way, the estimation with the least reprojection error is likely to be the best candidate.

Optionally, determining the probability further comprises an estimation of the future poses in dependence upon similarities to one or more prior moving objects.

Optionally, determining the probability comprises any combination of similarity of visual appearances, comparing the estimated 3D position to its detection in a following image and estimated future poses in dependence upon similarities to one or more prior moving objects.

Optionally, the at least one visual data sensor is mounted on a moving object and comprises any or a combination of: an image camera; a video camera; a monocular camera; a depth camera; a stereo image camera; a high dynamic range camera, a light detection and ranging sensor; a radio detection and ranging sensor; an inertial measurement unit.

In this way cheap visual sensors such as mobile 'phone cameras can be exploited to collect city-scale motion patterns and environmental information which can be effectively used for trajectory predictions without any explicit modelling. In the past, some approaches relied on calibrating a stereo rig mounted on a car which can be less efficient.

Optionally, the object comprises any or a combination of a vehicle, a bicycle, motor-cycle.

Optionally, the step of receiving one or more images from at least one visual data sensor is performed in substantially real-time.

According to another aspect, there is provided a system for substantially continuously tracking and estimating poses of one or more moving objects, the system operable to perform the method of any of the above features.

According to another aspect, there is provided a system for substantially continuously tracking and estimating poses of one or more moving objects, the system operable to perform the method of any of the above features, the system comprises: a localisation system for determining pose data for one or more images; a convolutional neural network for detecting one or more moving objects; and a motion prediction system for providing estimates of future poses based on sequential trajectory data from one or more prior moving objects that intersected the vicinity of the position of the one or more moving object.

According to another aspect, there is provided a computer program product for providing the method or system of any preceding claim.

BRIEF DESCRIPTION OF DRAWINGS

Embodiments will now be described, by way of example only and with reference to the accompanying drawings having like-reference numerals, in which:

FIG. 2b depicts the logic flow of an embodiment;

FIG. 6 depicts the logic flow of an embodiment;

DETAILED DESCRIPTION

Figure 1:
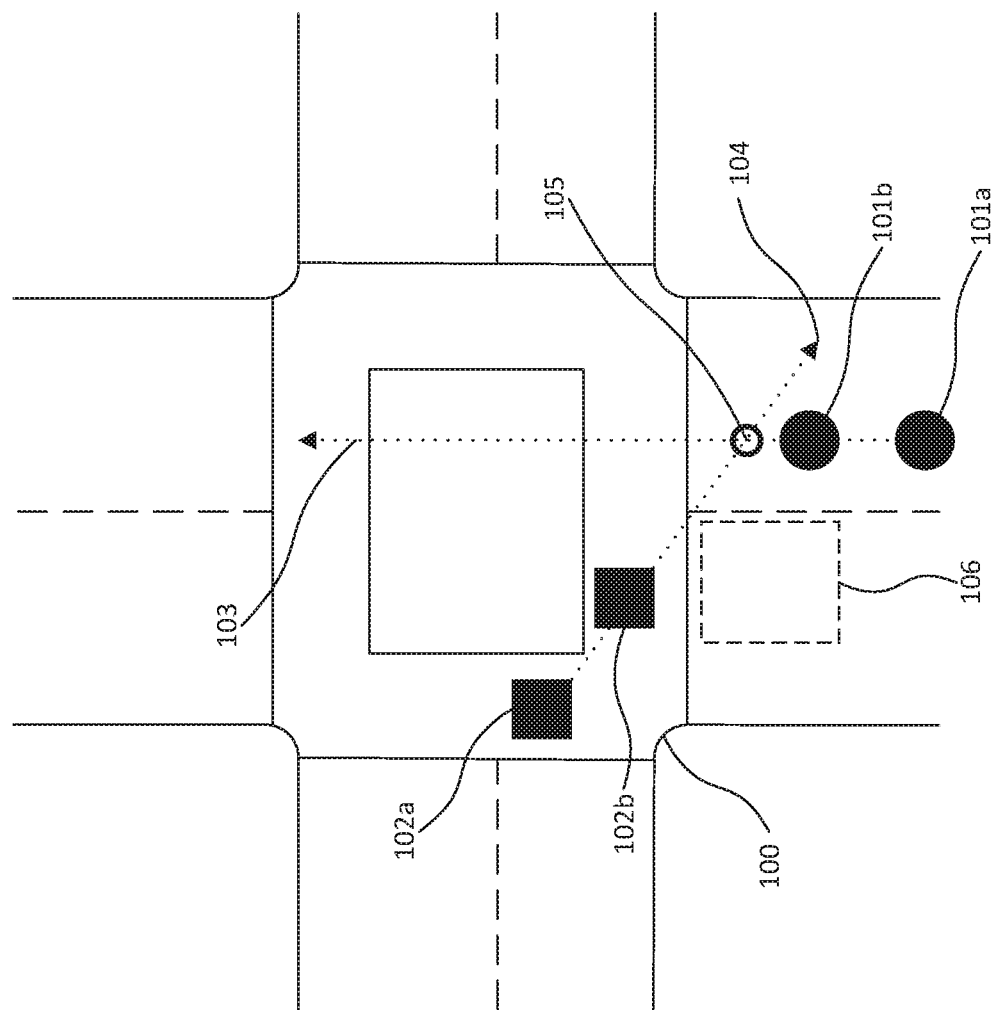
FIG. 1 illustrates an example of a known linear extrapolation model to predict the future position of a detected vehicle at an intersection.

FIG. 1 depicts one of the problems seen by current methods of predicting future motion. More specifically, the illustration relates to motion models that rely on linear extrapolation of motion data.

The figure shows a bird's eye view of a four-way road intersection 100. A first vehicle 101 is depicted approaching the intersection. The position of the first vehicle at a first time, t, is shown as 101a and the position of the first vehicle at a second time, t+1, is shown as 101b. The trajectory of the first vehicle is indicated as a straight path 103.

A second vehicle 102 is also depicted in the figure. The second vehicle is seen mid-way through the intersection at the first time, t, shown as 102a and the second time, t+1, shown as 102b. Although in real-world scenarios, the position on the second vehicle is likely to be in the area indicated by 106, using the linear motion model, the system assumes the second vehicle is traversing along a second straight path 104. According to this interpretation, the linear model expects the two vehicles to collide at point 105 which is the point the first 103 and second 104 straight paths intersect.

However, anyone with an appreciation of traffic rules and/or a highway code will at a first glance disagree with the expected collision predicted by the linear motion model. Since linear motion models do not incorporate curved motions of real world scenarios the true nature of where the second vehicle is actually likely to be after passing through the intersection 106 is not accounted for. The use of these models therefore results in inaccurate and unreliable estimations of future positions of moving vehicles.

In a similar way, various methods have been proposed over years to understand and model vehicle motion dynamics, driver intent and vehicle interactions with the environment and neighbouring agents. In most cases, motion prediction involves relying fully or partly on a vehicle dynamics model. For example, some methods compare and evaluate several motion models for tracking vehicles. These methods conclude that constant turn rate and acceleration model (CTRA) perform the best. Other methods include constant turn rate and velocity (CTRV), constant steering angle and velocity (CSAV), constant curvature and acceleration (CCA) and purely linear motion models such as constant velocity (CV) or constant acceleration (CA), as previously described.

These models are usually combined with Kalman filtering or Bayesian filtering for path prediction. However, these approaches are only able to perform predictions for a very short window into the future. In order to address this, some models combine a constant yaw rate and acceleration model with a manoeuvre classifier to predict vehicle trajectories. But these methods are restricted to limited scenarios and are constrained by the number of manoeuvres.

As opposed to explicitly crafting vehicle dynamics, Dynamic Bayesian networks, Gaussian mixture models, Hidden Markov models, Neural networks or a combination of these techniques are used to provide data-driven approaches to vehicle dynamics. Although these approaches achieve better performance than pure vehicle dynamics-based approaches, they are either trained for specific limited scenarios (e.g., highways) or tend to learn a general model that does not utilise environment specific cues such as traffic pattern in the area, changes in the environment structure, etc.

In addition, the known methods of estimating future motion of vehicles are restricted to a small-time window and are not sufficiently able to continuously track a vehicle. Some currently adopted tracking methods use environmental cues for 3D tracking. These methods often rely on 3D scene analysis to augment tracking of an object. For example, by querying 3D scene layouts and object positions at urban intersections and performing 3D object tracking by enforcing scene geometry and showing 3D dynamics-based constraints.

Some methods make use of ground plane and 3D location priors to obtain 3D object detections. However, they do not perform 3D tracking and their ground plane assumption fails in real driving scenarios involving up-hill and down-hill slopes.

An example embodiment will now be described with reference to FIGS. 2a to 6.

The embodiment presents an augmented end to end visual tracking pipeline system to continuously track positions of nearby vehicles around a camera equipped vehicle. This can be used as a situation-awareness module to predict and react to the motion of the other vehicles in the vicinity.

Figure 2A:
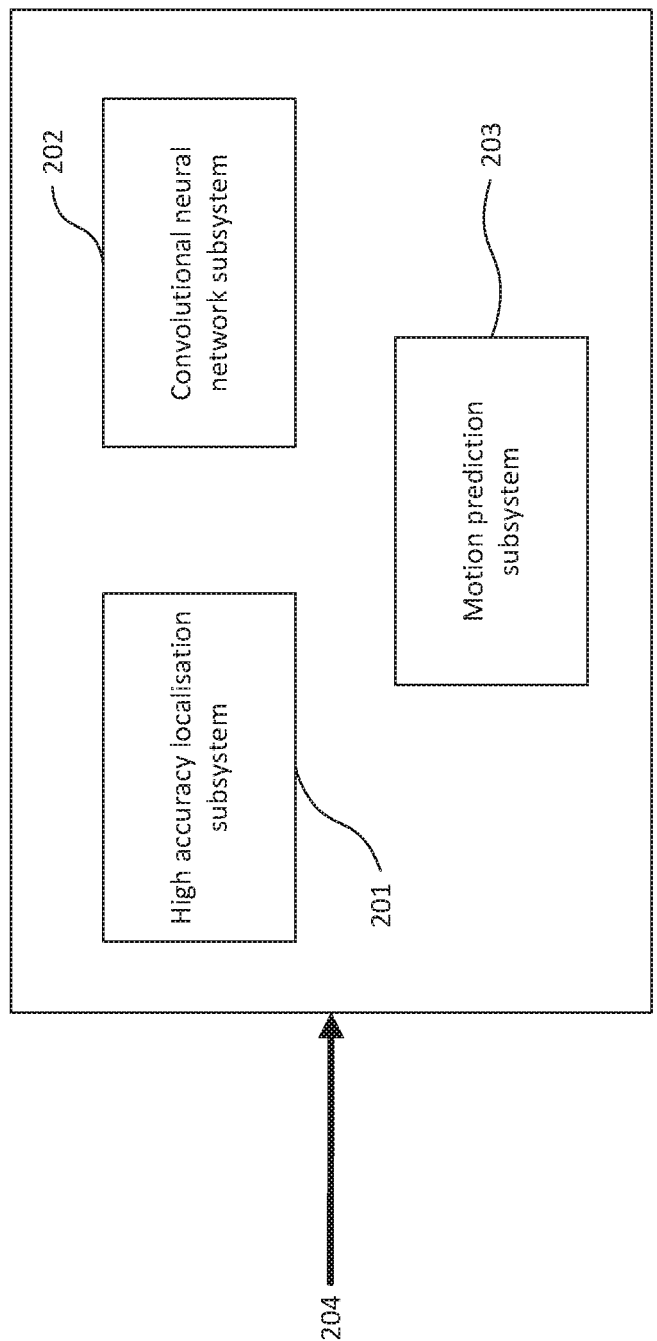
FIG. 2a illustrates the components of an embodiment.

As illustrated in FIG. 2a, the pipeline comprises three main components. A high-accuracy localisation subsystem 201, a convolutional neural network-based car detector 202 and a motion prediction subsystem 203.

As depicted by 204, the input of the pipeline is a live stream of images, $I_1, I_2, \ldots, I_t$, that are captured at regular intervals, $\Delta t$. As an example, the stream of images may be provided to the pipeline by a visual sensor mounted on a vehicle. The stream of images is processed iteratively, frame by frame, and for each processing step a set of 3D positions and velocities of visible vehicles, $s_t^1, s_t^2, \ldots, s_t^n$, and their 2D observations, $c_t^1, c_t^2, \ldots, c_t^n$, are produced.

For each new image received $I_t$, the exact pose, $q_t \in SE(3)$, of the image is determined in the 3D space. This step is carried out using the high-accuracy localisation subsystem 201. Although large-scale visual localisation is challenging, it can be carried out efficiently by performing a feature-based visual localisation using a structure-from-motion 3D map, such as those illustrated in FIGS. 3a and 3b. As described below, the structure-from-motion map can be the same 3D map that the prior motion data is extracted from. In that way, the image pose captured is accurately aligned with respect to the prior motion samples in the area necessary for 2D-3D association described later.

Once each image is processed through the localisation component, each image is then processed by a convolutional neural network 202 to detect and produce a list of vehicles observed in each image, $c_t^1, c_t^2, \ldots, c_t^n$. The observed vehicles are depicted in the form of 2D bounding boxes around the vehicles and a confidence distribution rating over the object categories is also calculated. As an example of a convolutional neural network (CNN), a standard Faster-RCNN object detector may be implemented to only consider vehicles detected above a certain threshold.

In the third component 203 of the pipeline, the future motion of each observation is predicted. When considering the movement of a vehicle along a path there are two options to consider. Each observation can either be a part of an existing track (such that the vehicle was previously detected at time, $t' > t-T$, where T is a tracking window for the pipeline), or the observed vehicle is part of a new track.

Accordingly, for each detected vehicle, $c_t^i$, and each previously detected vehicle, $c_{t'}^j$, it is hypothesised that the system observes the same vehicle. In doing so, the system considers the vehicle's previous position, $s_{t'}^j$, and that the likelihood of the vehicle's future motion to be in line with the paths of previous vehicles traversing the same area. This can be achieved using motion priors or prior trajectory data, G. In the same way, it is also hypothesised that a new vehicle has been observed. The logic flow for the entire tracking pipeline is depicted in FIG. 2b.

After considering both scenarios, the most likely candidate hypothesis and the associated estimated pose, $s_t^i$, for each detected vehicle, $c_t^i$, is selected.

The use of prior vehicle trajectory data as mentioned above can be implemented and used as part of the pipeline as exemplified in FIGS. 3 to 8, which describes a single-shot motion prediction system.

The first step of the single-shot motion prediction systems is to capture data relating to the observed state of the moving vehicle 201. For an observed vehicle, the initial state ($s_0$) of the car or vehicle includes position data ($x_0 \in R^3$), rotation data ($r_0 \in SO(3)$) and velocity data ($v_0 \in R$). Mathematically this can be represented as:

$$s_0 = (x_0, r_0, v_0)$$

The system then gathers trajectory data of vehicles that have previously traversed the area in which the new moving vehicle was detected. Although any traditional method may be implemented to obtain this data, the preferred option is to extract data from map data that was constructed using structure-from-motion techniques. This advantageously enables a large amount of crowd-sourced high-quality motion data to drive the motion prediction of this invention. As an example, this type of data can be collected by equipping a large fleet of vehicles with cameras and performing structure-from-motion at a city scale to accurately reconstruct their trajectories. As will be further elaborated below, this data can be used a sample for the underlying motion distribution in the area and be used for future motion prediction of newly observed cars.

Structure from motion methods have the benefits of needing zero human annotation as it implicitly captures modelled and unmodelled aspects of the vehicle motion, scales to large city-scale scenarios and improves with time as the amount of data increases. This data is usually built up of sequential images over a period of time. Additionally, each image also includes pose information which can be used to vehicles position, rotation and velocity along its path.

Figure 3A:
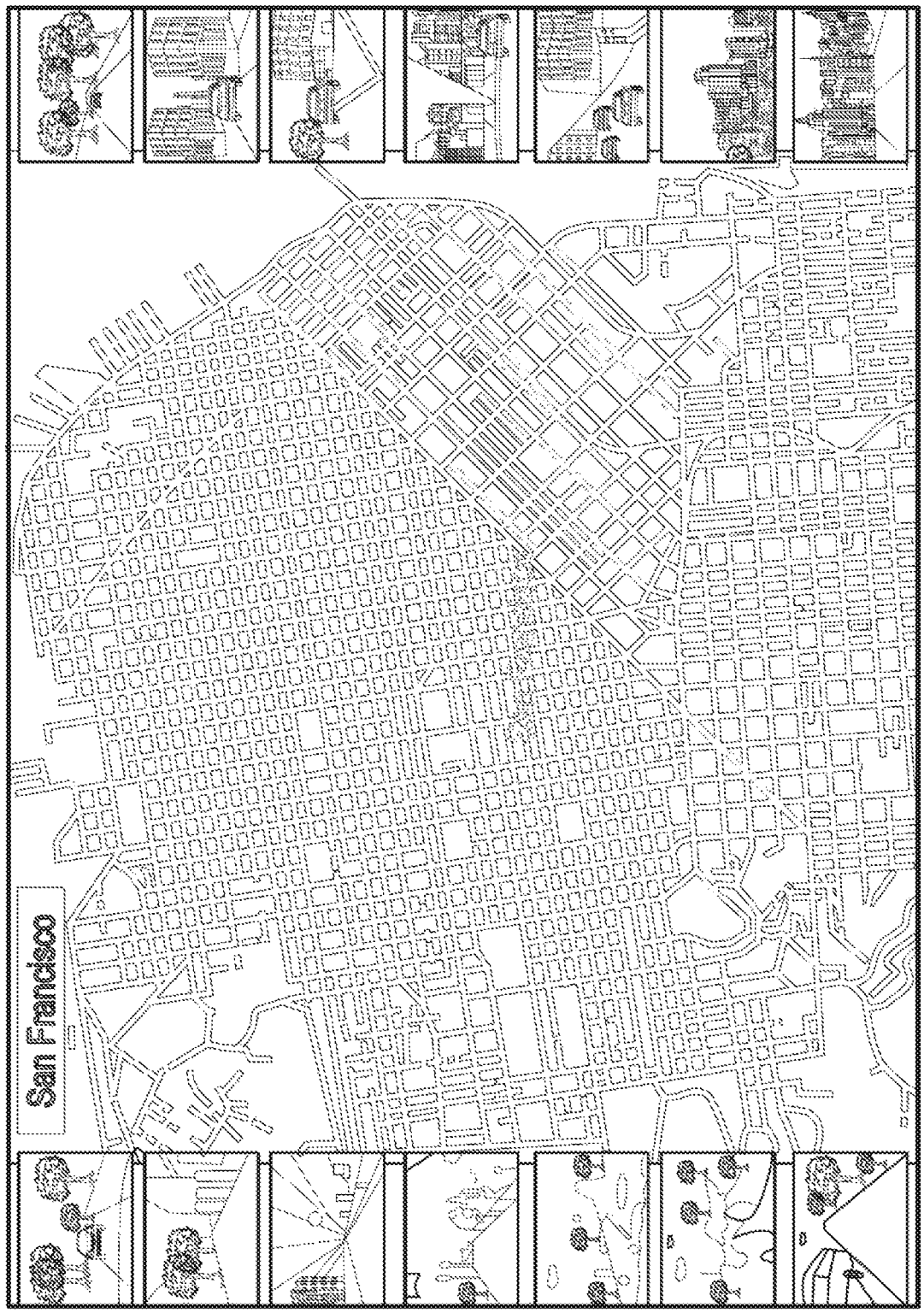
FIGS. 3a and 3b illustrate map datasets used by an embodiment.
Figure 3B:

Example city scale map datasets are depicted in FIGS. 3a and 3b. The datasets shown in these figures were compiled using over ten million images captured in San Francisco and New York using dash-cam mounted mobile 'phones. The images were used to perform large-scale structure-from-motion to reconstruct accurate vehicle trajectories in the cities over a period of several weeks. Although a monocular camera of a mobile 'phone was executed to derive the datasets shown in this figure, any type of visual sensor may be used to compile the initial sequential image data. As a result, prior trajectory data can be automatically extracted as a by-product of building a large-scale crowd-sourced 3D map of the environment.

Figure 4A:
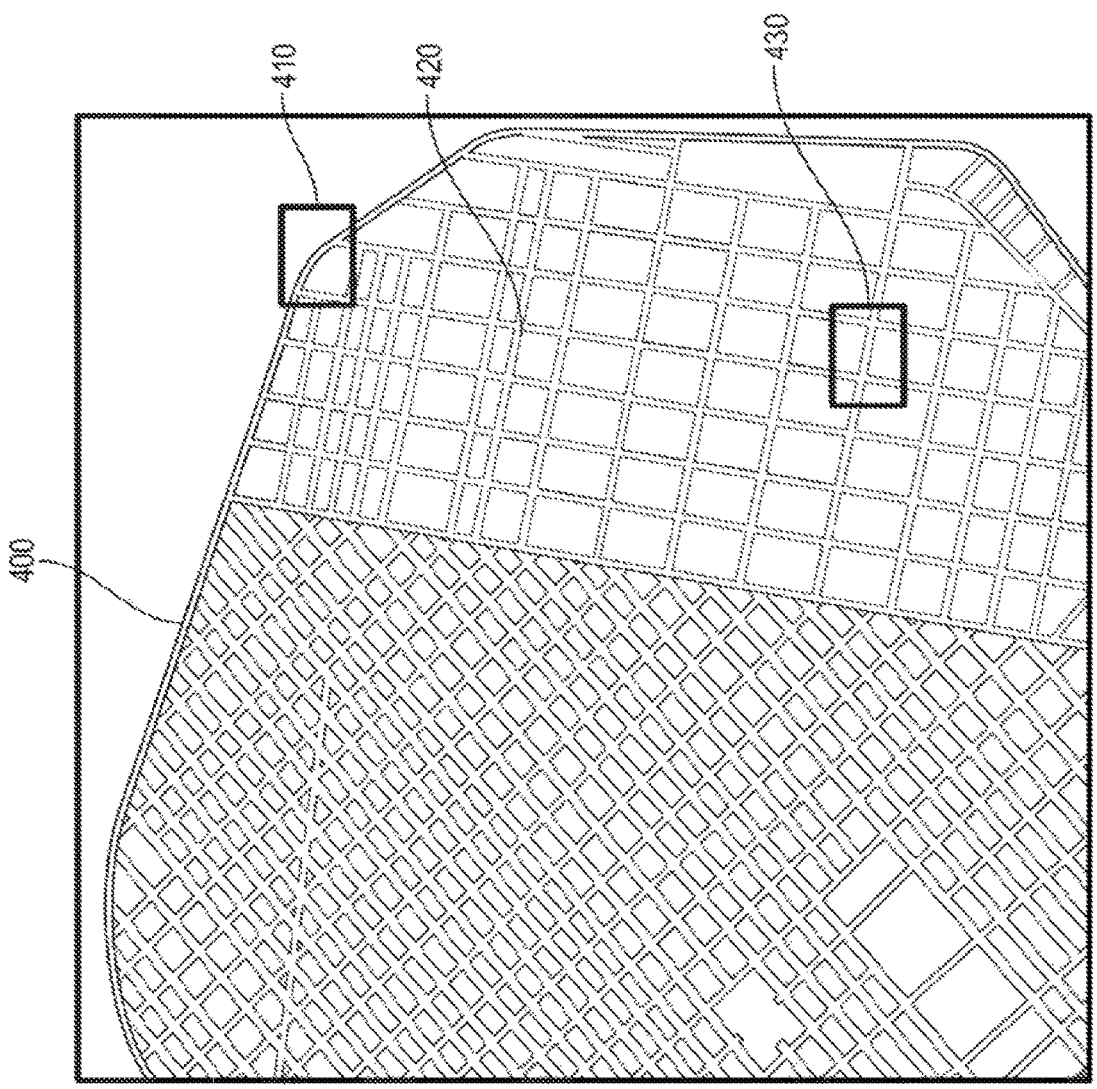
FIGS. 4a, 4b, 4c and 4d illustrate prior trajectory information used by an embodiment.
Figure 4B:
Figure 4C:
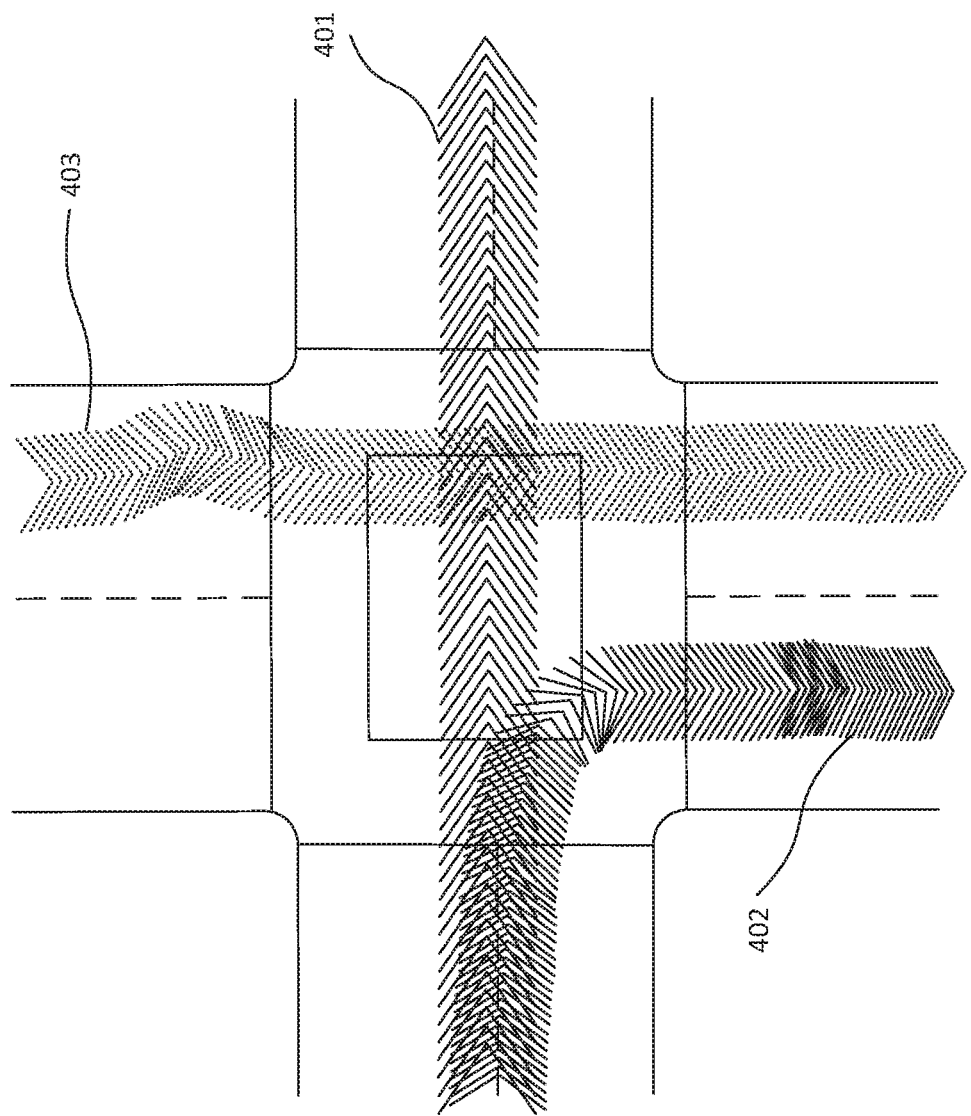
Figure 4D:
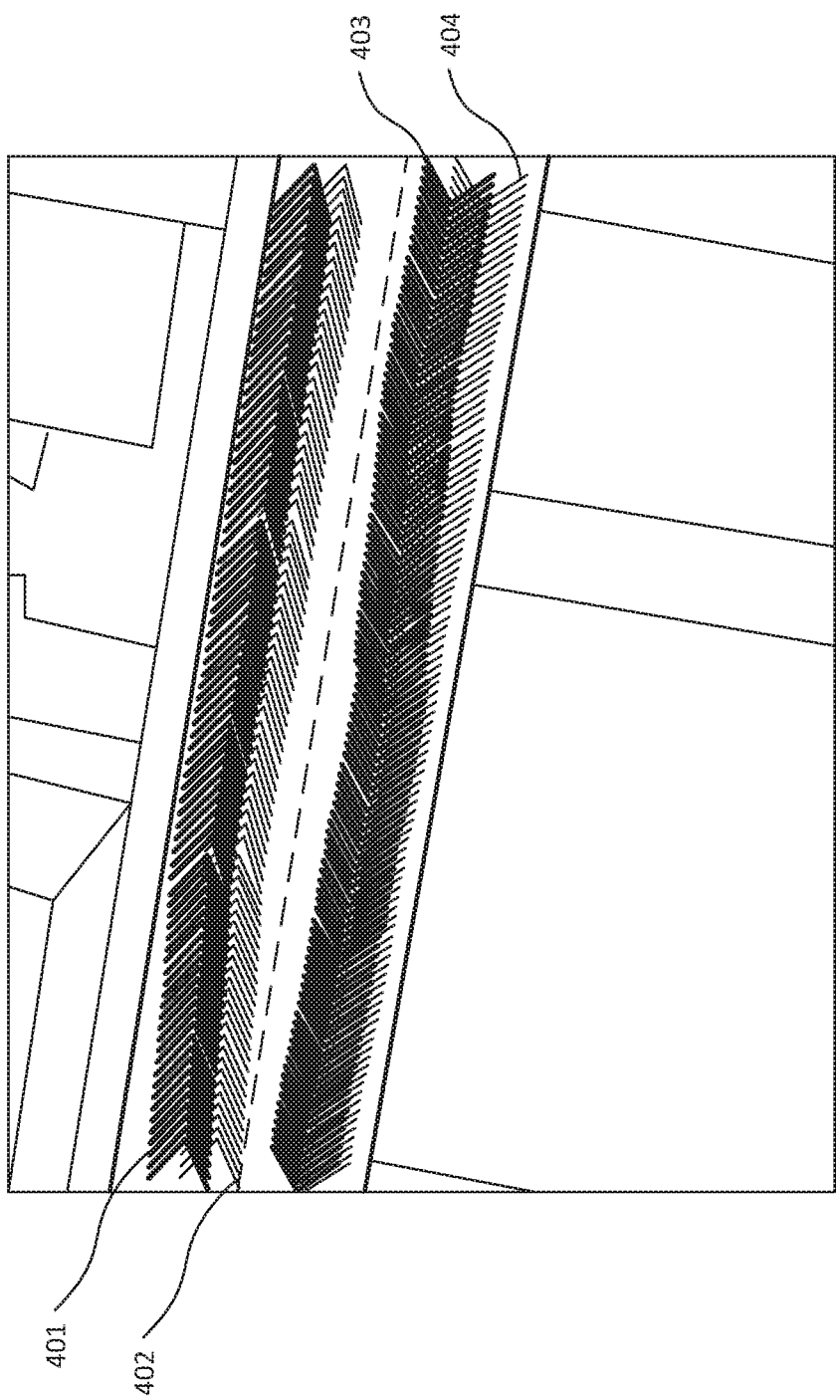

FIG. 4a illustrates the trajectories 400 extracted from the San Francisco data set, as generated by a randomised fleet of vehicles, which is used by this invention as prior trajectory data. FIGS. 4b, 4c and 4d correspond to points 410, 420 and 430, respectively, in FIG. 4a. These figures illustrate a few paths taken by the fleet of vehicles (401, 402, 403, 404) and their respective orientations. These figures illustrate the vehicles' motion along a curved road (FIG. 4b), an intersection (FIG. 4c) and a straight road (FIG. 4d).

In this way, the invention utilises location specific information for accurate future predictions. Instead of learning a global generic model or relying on limited variable models, the invention relies on historical vehicle trajectories in the locality of a newly detected vehicle to perform on-the-fly future position prediction, in substantially real time.

As aforementioned, the motion prior data comprises of a large set of individual trajectory samples that contain accurate 3D positions and rotations of vehicles driven through the area in the past. Mathematically, this is represented as $G=\{G^1, G^2, \ldots, G^N\}$, where each trajectory $G^i = \{s_1^i, s_2^i, \ldots, s_m^i\}$ is a sequence of observed positions, rotations, and velocities of the car at regular time intervals $t=1, 2, 3 \ldots$ as the car had been driven around the city. Using this system, there is no requirement to use manual or semantic annotations of the environment or any knowledge of traffic rules. Instead it is assumed that each trajectory or path implicitly captures all relevant local and road information in the behaviour of the vehicle's motion.

Once prior trajectory information has been obtained, a number of future positions of the newly observed vehicle are estimated. In order to predict the future position of a vehicle at a time t, it is hypothesized that the newly observed vehicle is following the same path and trajectory pattern as one of the previous vehicles at the same location. Specifically, for each prior state $s_j^i$ of a prior trajectory, it is assumed that the newly observed vehicle is going to follow the same motion pattern as the previous vehicle that generated the prior trajectory continuing from that state. Given this assumption, the pose of the vehicle in the future is likely to be:

$$s_t = s_{j+t}^i + \epsilon$$

where $s_{j+t}^i$ is the observed pose of the vehicle previously driven through the area t seconds after the queried state (when the new vehicle was first observed) and $\epsilon$ is random noise taking into account that the trajectory can slightly differ. Examples of estimated future positions or samples can be seen in FIGS. 5a and 5b, where 501 illustrates a newly observed vehicle at a first time, t, and 502 illustrates the estimated future positions of the vehicle and a second time, t+1.

Having estimated the likely future position for the newly observed vehicle based on prior positions and trajectories of each or any of the previous vehicles, in order to improve the estimation, the samples are constrained by assessing the likelihood of the observed vehicle following the path of the one or more samples.

Mathematically, the distribution of the future pose is a weighted sum of individual factors:

$$p(s_t \mid s_0, G) = \frac{1}{Z} \sum K(s_j^i, s_0) p(s_t \mid s_{j+t}^i, \epsilon)$$

where Z is a normalisation factor:

$$Z = \Sigma K(s_j^i, s_0),$$

and $K(s_j^i, s_0)$ measures the similarity of a prior state to the current state of a newly observed vehicle, capturing the likelihood that it can indeed follow the exhibited prior motion pattern. This similarity is modelled as the sum of a number of individual factors:

$$K(s_j^i, s_0) = \exp\left\{-\frac{\|x_j^i - x_0\|^2}{\sigma_x^2} - \frac{\|r_j^i - r_0\|^2}{\sigma_r^2} - \frac{\|v_j^i - v_0\|^2}{\sigma_v^2}\right\}$$

where $\|x_j^i - x_0\|^2$ is the Euclidean distance between the sample position and the observed position of the vehicle in the 3D space, $\|r_j^i - r_0\|^2$ is the relative difference of heading angles between the sample and the observed vehicle and $\|v_j^i - v_0\|^2$ is the difference in linear speed. The parameters $\sigma_x$, $\sigma_r$ and $\sigma_v$ model the relevance of the individual factors.

By constraining the samples in this way, the most likely estimates for the future positions of the observed vehicles based on the prior vehicle data are produced.

Thus, the probability density function $p(s_t \mid s_0, G)$ can be evaluated explicitly in a closed form. Moreover, a sampling procedure can be implemented efficiently by first sampling the corresponding prior state $s_j^i$ according to relevance factor K, performing table look-up for $s_{j+t}^i$ and adding noise. This is depicted in FIG. 6.

Figure 7:
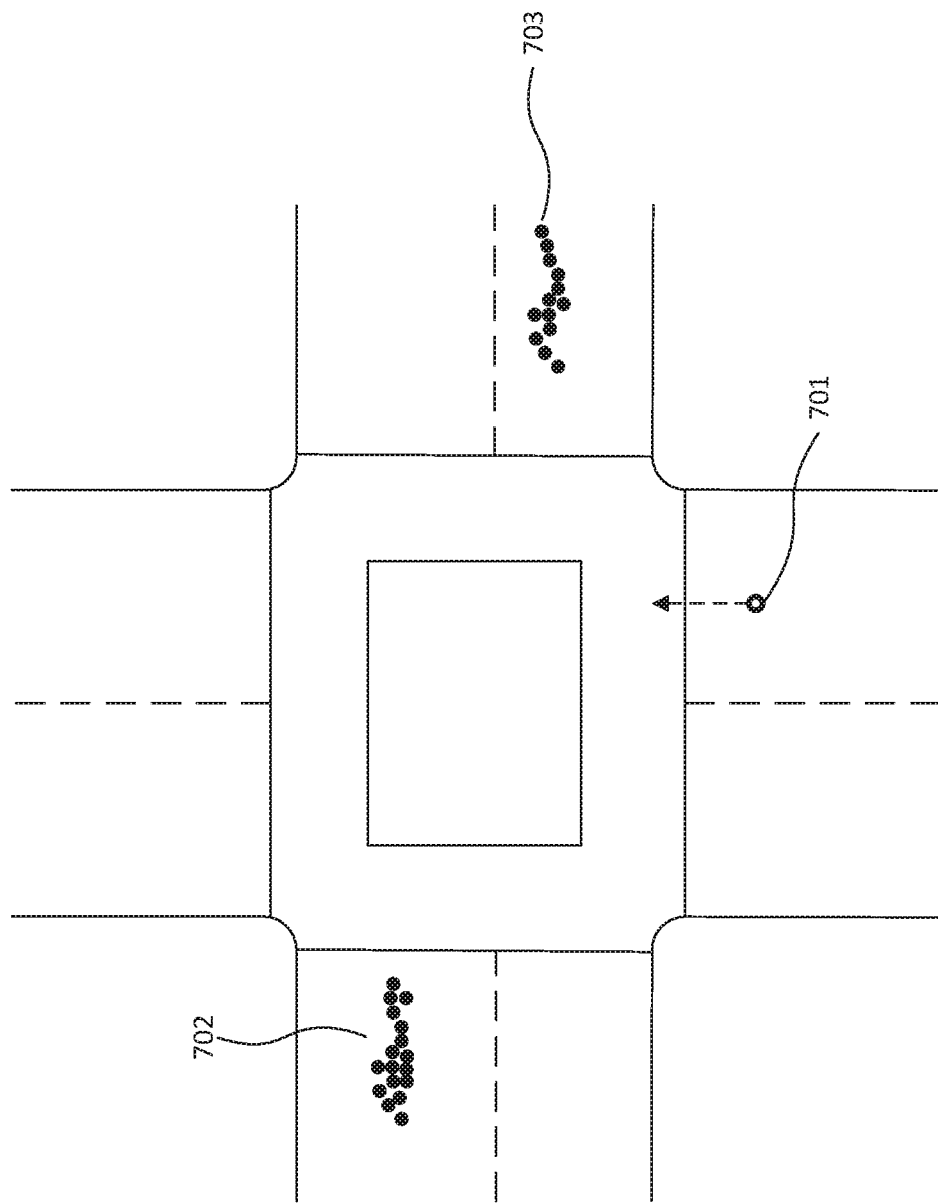
FIG. 7 illustrates samples of estimated positions produced in accordance with an embodiment.

An example of future vehicle motion prediction is illustrated in FIG. 7. 701 represents an observed vehicle at a query position and a velocity at time t. The groupings of 702 and 703 represent the distribution of predicted samples of the vehicle at a time of t+5. Notably, the road ahead of the vehicle is a one-way road in the opposite direction of the vehicle's motion. Without needing any manual input of road traffic signage, the method implicitly captures this information by using the paths of previous vehicles in the area. Thus, the only two potential options for the vehicle is taking a left or right at the intersection.

Figure 5A:
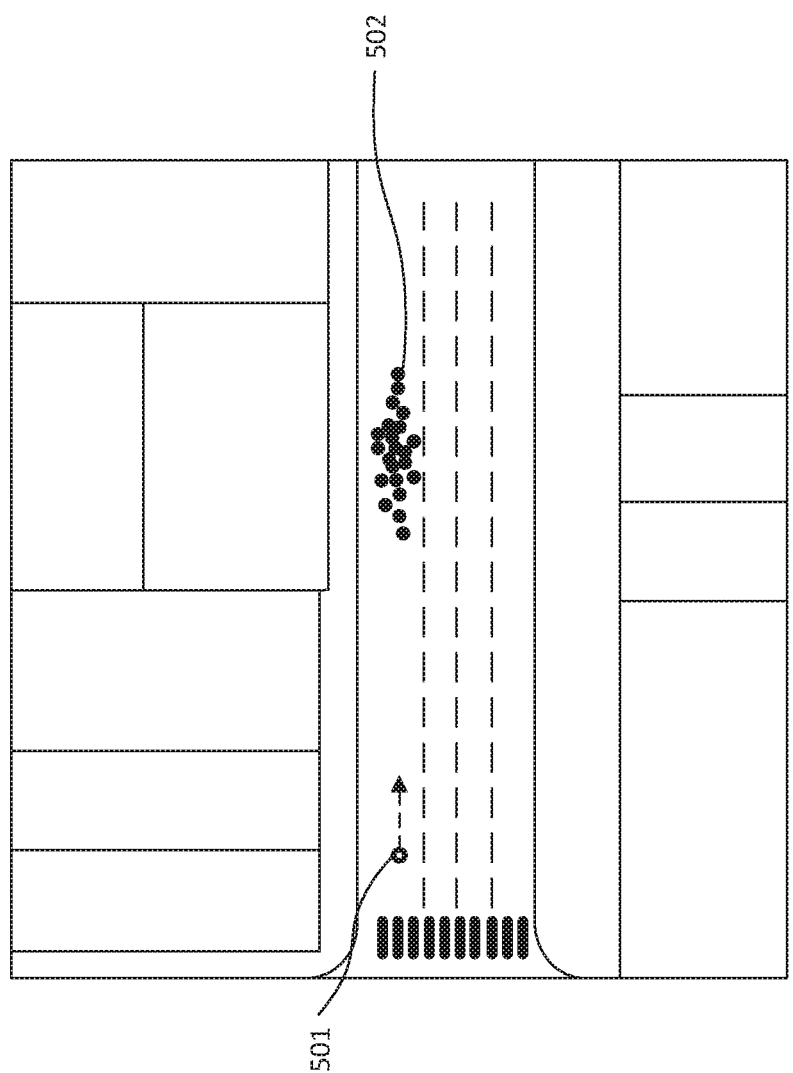
FIGS. 5a and 5b illustrate samples of estimated positions produced in accordance with an embodiment.
Figure 5B:
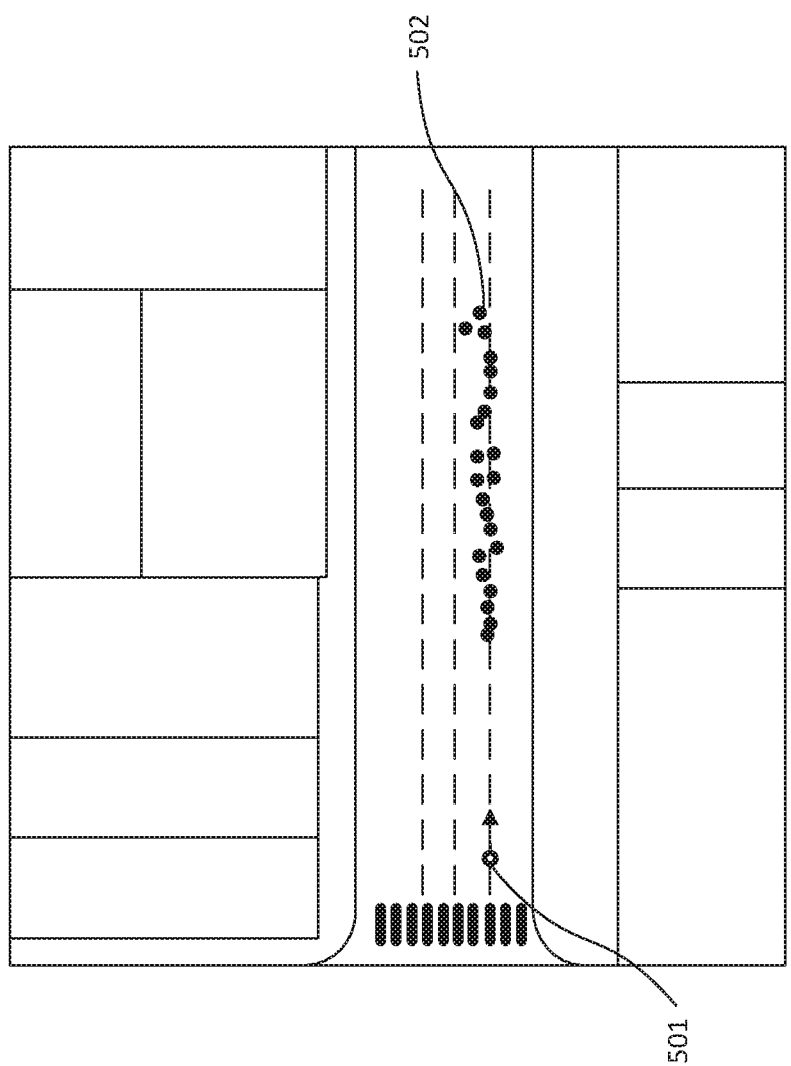

FIG. 5 also illustrates samples drawn from prior data. As depicted, sampling follows the previously observed trajectories of prior motion in the area while parameters a model the relevance of the individual components to the state of the observed vehicle. For example, a small value of $\sigma_v$ (FIG. 5a)

results in predictions matching the current velocity of the newly observed vehicle while a larger $\sigma_v$ (FIG. 5b) results in future predictions sampled using a wider variety of the previously observed initial velocities.

Figure 8:
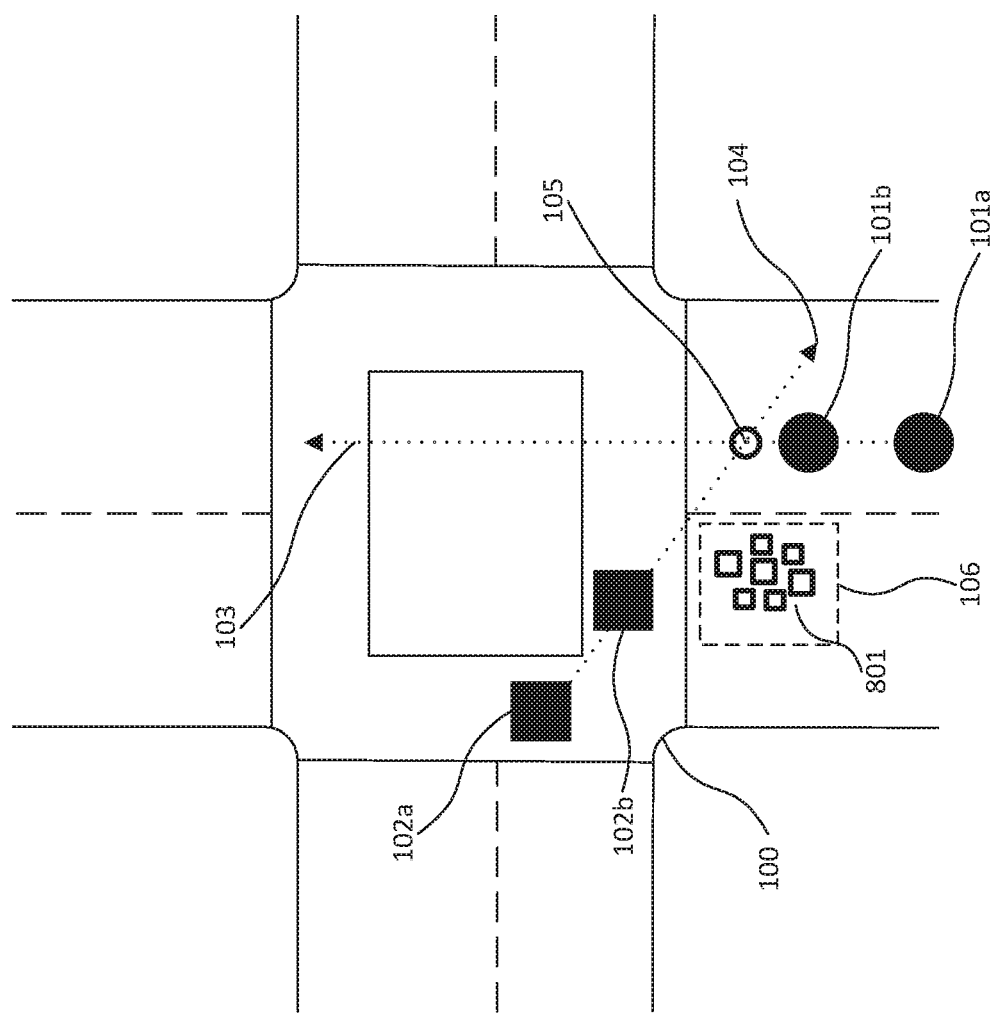
FIG. 8 illustrates an example embodiment of the present invention to predict the future position of a detected vehicle at an intersection.

In FIG. 1, motion prediction using linear extrapolation was illustrated. In contrast, FIG. 8 depicts how the method of this invention predicts the future movements of a vehicle in the same scenario. As opposed to relying on linear projections of the trajectories, 801 depicts a cluster of estimated future positions of the vehicle 102 using prior trajectory data.

Although the method above for implementing prior trajectory data is exemplified, any other implementation may also be used with the present invention.

Moving back to the end to end pipeline, as described above, for each detected car, $c_t^i$, it is hypothesised, $p_j^i$ that a new observation is the same a previously detected vehicle, $c_{t'}^j$. This consideration requires frame to frame association and therefore, for each such hypothesis, the most probable 3D pose and velocity supporting this hypothesis, $s_t^{ij}$, is calculated:

$$s_t^{ij} = \underset{s_t^i}{\mathrm{argmax}}\, p(s_t^i, c_t^i \mid c_{t'}^j, s_{t'}^j, q_t, G)$$

which can be factorised as:

$$p(s_t, c_t \mid c_{t'}, s_{t'}, q_t, G) \propto p(c_t \mid c_{t'}) p(s_t \mid c_t, q_t) p(s_t \mid s_{t'}, G)$$

where:
$p(c_t \mid c_{t'})$ is the similarity in visual appearances,
$p(s_t \mid c_t)$ is the consistency of the observed vehicle in the 2D image and its position in 3D space, and
$p(s_t \mid s_{t'}, G)$ is the likelihood of the future motion predicted using the prior trajectory data, as exemplified through FIGS. 3 to 8 and the accompanying paragraphs above.

A solution which satisfies the appearance model but violates the prior motion model will have a low probability. Similarly, a low probability will also exist when the prior motion model is satisfied but not the appearance model. Thus, a good solution satisfies all of the models.

The consistency of the visual appearance $p(c_t \mid c_{t'})$ is modelled by the number of visually matching features on both detected vehicles. This is achieved by first extracting SIFT features for both images, $I_t$, $I_{t'}$, and then matching the descriptors between the frames. The probability is then calculated as the ratio of shared features between $c_t$ and $c_{t'}$. The pipeline considers the shared features between the bounding boxes of detected objects or vehicles to determine their correspondence. The probability can be represented as:

$$p(c_t \mid c_{t'}) = \frac{f^{i,j}}{f^i}$$

Importantly, the combination of a visual appearance probability and motion prior data produces a reliable and accurate results. As an example, relying on a visual appearance model alone would not accurately indicate the direction of travel or velocity estimates for observed vehicles.

Figure 9:
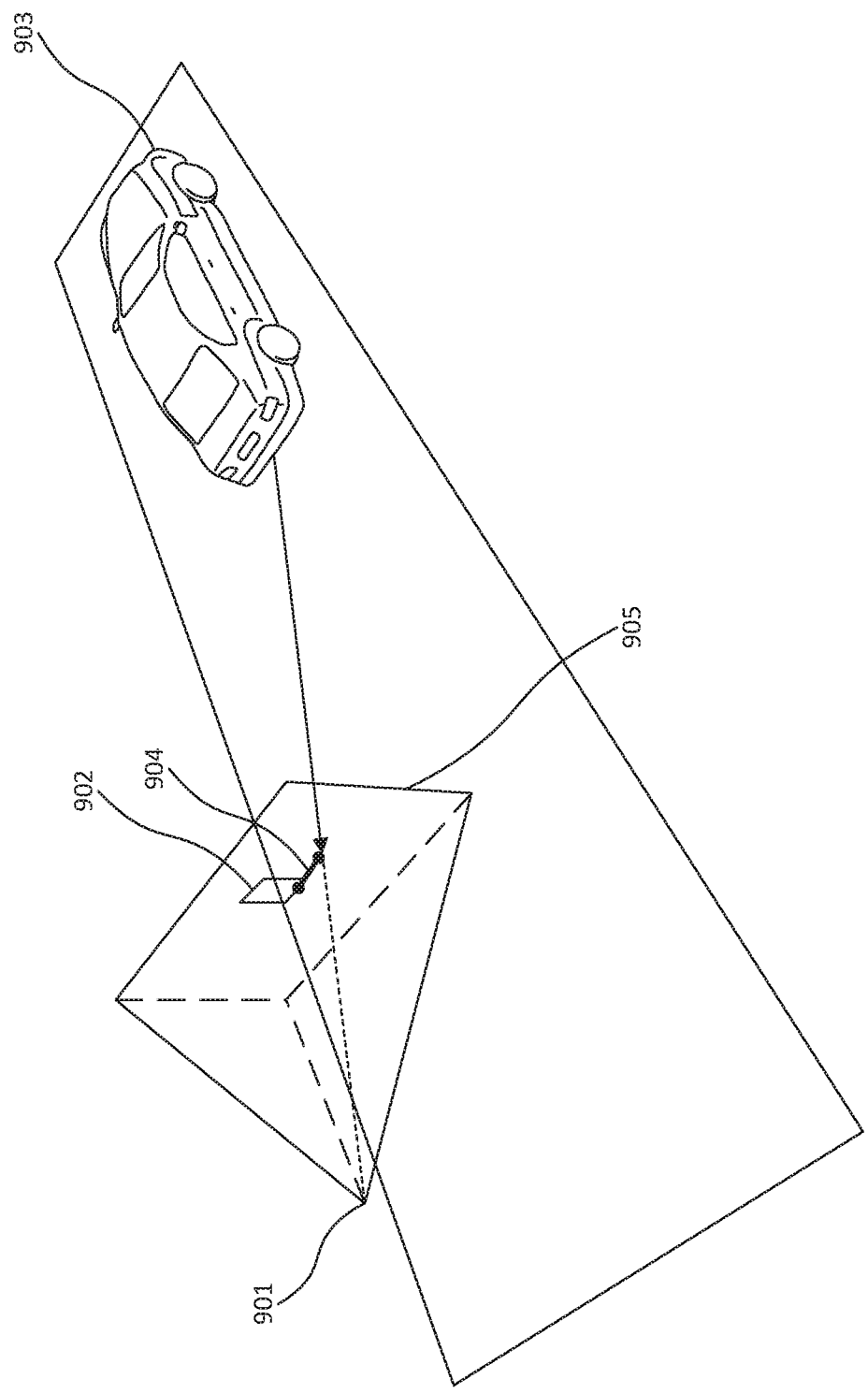
FIG. 9 illustrates how re-projection is used in the embodiment.

Finally, to ensure that the estimated 3D position of the vehicle corresponds to its 2D detection a re-projection constraint is used, as illustrated in FIG. 9. The 2D to 3D consistency can be represented as:

$$p(s_t \mid c_t) = \mathcal{N}(\pi(x_t, p_t), \sigma_c)$$

where $\pi(x_t, p_t)$ is the projected position 903 of the 3D point, $x_t$, into the camera image 905, $I_t$, located at position, $p_t$. The camera 901 will also be equipped to provide accurate position and orientation, 902 represents the actual 2D detection and 904 indicate the reprojection error (in pixels).

As the models for the 2D to 3D consistency of observed vehicle and the estimated future motion are continuous and differentiable, maximisation of the frame to frame association model can be performed using a classical Gauss-Newton optimisation method.

The method vastly improves the precision over traditional methods and also demonstrates continuously improving performance as the amount of prior data grows. The pipeline thus provides a data-driven non-parametric approach to predict the motion of vehicles at city-scale to effectively track vehicles from a moving car equipped with a monocular camera. This approach requires no form of annotation and is easy to scale to city sized data.

The camera equipped vehicle for the pipeline need not be restricted to a particular visual sensor configuration with this invention. Any method of capturing visual data of a vehicle's surroundings may be used (LIDAR, radar or stereo cameras). As an example, monocular cameras, known not only the most prevalent and cost-effective hardware platform but also the most difficult for implementation due to the missing depth perception of LIDARs or stereo cameras, were also successfully tested with this pipeline system. The results of the tests showed that the use of motion priors alleviated the problems associated with monocular cameras and helped predict the correct motion of surrounding vehicles with accuracy.

Any system features as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A computer-implemented method comprising:
   determining, by a computing system, from one or more captured images of an object in an environment, a trajectory of the object in the environment;
   determining, by the computing system, one or more prior trajectories of one or more prior objects in the environment;
   determining, by the computing system, an amount of similarity between the trajectory of the object and the one or more prior trajectories of the one or more prior objects; and
   based on the amount of similarity, predicting at least one future pose of the object in the environment.

2. The computer-implemented method of claim 1, wherein the determining the amount of similarity comprises:
   determining, by the computing system, at least one projected position associated with the at least one future pose of the object;
   projecting, by the computing system, the at least one projected position to at least one of the one or more captured images of the object; and determining, by the computing system, whether the object follows the one or more prior trajectories based on a reprojection error between at least one position of the object in the at least one of the one or more captured images and the at least one projected position.

3. The computer-implemented method of claim 2, wherein the object is determined to be associated with a new trajectory based on the reprojection error between the at least one position of the object and the at least one projected position failing to satisfy a threshold error.

4. The computer-implemented method of claim 1, wherein the determining the amount of similarity between the trajectory of the object to the one or more prior trajectories of the one or more prior objects comprises:
   determining a pose of at least one of the one or more captured images;
   aligning the pose with a prior pose of a prior image associated with the one or more prior trajectories; and
   aligning the trajectory of the object with the one or more prior trajectories based on the aligning the pose with the prior pose of the prior image.

5. The computer-implemented method of claim 1, further comprising:
   hypothesizing that the object will follow at least one of the one or more prior trajectories based on a first position of the object in a first image of the one or more captured images and at least one prior position of the one or more prior trajectories;
   determining that a likelihood that the object will follow the at least one of the one or more prior trajectories satisfies a threshold likelihood based on a second position of the object in a second image of the one or more captured images and at least one subsequent prior position of the one or more prior trajectories; and
   in response to the determining that the likelihood that the object will follow the at least one of the one or more prior trajectories satisfies the threshold likelihood, constraining the one or more prior trajectories to a subset of the one or more prior trajectories, wherein the subset of the one or more prior trajectories satisfy the threshold likelihood.

6. The computer-implemented method of claim 1, wherein the at least one future pose of the object is in accordance with the object following the one or more prior trajectories.

7. The computer-implemented method of claim 1, wherein the at least one future pose is predicted based on at least one of: a distance between an observed position of the object and a sample position of one of the one or more prior trajectories, a difference between an observed heading angle of the object and a sample heading angle associated with the one of the one or more prior trajectories, or a difference between an observed linear speed of the object and a sample linear speed of the one of the one or more prior trajectories.

8. The computer-implemented method of claim 1, wherein the trajectory of the object is associated with a first pose at a first time and the at least one future pose is based on a distribution of prior poses associated with the one or more prior trajectories, wherein the prior poses correspond to a second time subsequent to the first time.

9. The computer-implemented method of claim 1, wherein the one or more prior trajectories are based on at least one of: data sets captured for a structure-from-motion map of a locality associated with the environment or captured camera images, wherein each of the captured camera images include pose associated with the one or more prior objects.

10. The computer-implemented method of claim 1, further comprising:
    determining, by the computing system, at least one of a position, rotation, or velocity of the object using the at least one future pose.

11. A system comprising:
    at least one processor; and
    a memory storing instructions that, when executed by the at least one processor, cause the at least one processor to perform:
       determining from one or more captured images of an object in an environment, a trajectory of the object in the environment;
       determining one or more prior trajectories of one or more prior objects in the environment;
       determining an amount of similarity between the trajectory of the object and the one or more prior trajectories of the one or more prior objects; and
       based on the amount of similarity, predicting at least one future pose of the object in the environment.

12. The system of claim 11, wherein the determining the amount of similarity comprises:
    determining at least one projected position associated with the at least one future pose of the object;
    projecting the at least one projected position to at least one of the one or more captured images of the object; and
    determining whether the object follows the one or more prior trajectories based on a reprojection error between at least one position of the object in the at least one of the one or more captured images and the at least one projected position.

13. The system of claim 12, wherein the object is determined to be associated with a new trajectory based on the reprojection error between the at least one position of the object and the at least one projected position failing to satisfy a threshold error.

14. The system of claim 11, wherein the determining the amount of similarity between the trajectory of the object to the one or more prior trajectories of the one or more prior objects comprises:
    determining a pose of at least one of the one or more captured images;
    aligning the pose with a prior pose of a prior image associated with the one or more prior trajectories; and
    aligning the trajectory of the object with the one or more prior trajectories based on the aligning the pose with the prior pose of the prior image.

15. The system of claim 11, wherein the at least one processor is further configured to cause the system to perform:
    hypothesizing that the object will follow at least one of the one or more prior trajectories based on a first position of the object in a first image of the one or more captured images and at least one prior position of the one or more prior trajectories;
    determining that a likelihood that the object will follow the at least one prior trajectory satisfies a threshold likelihood based on a second position of the object in a second image and subsequent prior positions of the one or more prior objects; and
    in response to the determining that the likelihood that the object will follow the at least one of the one or more prior trajectories satisfies the threshold likelihood, constraining the one or more prior trajectories to a subset of the one or more prior trajectories, wherein the subset of the one or more prior trajectories satisfy the threshold likelihood.

16. A non-transitory computer-readable storage medium including instructions that, when executed by at least one processor of a computing system, cause the at least one processor of the computing system to perform:
- determining from one or more captured images of an object in an environment, a trajectory of the object in the environment;
- determining one or more prior trajectories of one or more prior objects in the environment;
- determining an amount of similarity between the trajectory of the object and the one or more prior trajectories of the one or more prior objects; and
- based on the amount of similarity, predicting at least one future pose of the object in the environment.

17. The non-transitory computer-readable storage medium of claim 16, wherein the determining the amount of similarity comprises:
- determining at least one projected position associated with the at least one future pose of the object;
- projecting the at least one projected position to at least one of the one or more captured images of the object; and
- determining whether the object follows the one or more prior trajectories based on a reprojection error between at least one position of the object in the at least one of the one or more captured images and the at least one projected position.

18. The non-transitory computer-readable storage medium of claim 17, wherein the object is determined to be associated with a new trajectory based on the reprojection error between the at least one position of the object and the at least one projected position failing to satisfy a threshold error.

19. The non-transitory computer-readable storage medium of claim 16, wherein the determining the similarity between the trajectory of the object to the one or more prior trajectories of the one or more prior objects comprises:
- determining a pose of at least one of the one or more captured images;
- aligning the pose with a prior pose of a prior image associated with the one or more prior trajectories; and
- aligning the trajectory of the object with the one or more prior trajectories based on the aligning the pose with the prior pose of the prior image.

20. The non-transitory computer-readable storage medium of claim 16, further comprising:
- hypothesizing that the object will follow at least one of the one or more prior trajectories based on a first position of the object in a first image of the one or more captured images and at least one prior position of the one or more prior trajectories;
- determining that a likelihood that the object will follow the at least one of the one or more prior trajectories satisfies a threshold likelihood based on a second position of the object in a second image of the one or more captured images and at least one subsequent prior positions of the one or more prior trajectories; and
- in response to the determining that the likelihood that the object will follow the at least one of the one or more prior trajectories satisfies the threshold likelihood, constraining the set of prior trajectories to a subset of the one or more prior trajectories, wherein the subset of the one or more prior trajectories satisfy the threshold likelihood.

* * * * *